US010212534B2

(12) United States Patent
Luna et al.

(10) Patent No.: US 10,212,534 B2
(45) Date of Patent: Feb. 19, 2019

(54) INTELLIGENT DEVICE CONNECTION FOR WIRELESS MEDIA ECOSYSTEM

(71) Applicants: Michael Edward Smith Luna, San Jose, CA (US); Thomas Alan Donaldson, London (GB)

(72) Inventors: Michael Edward Smith Luna, San Jose, CA (US); Thomas Alan Donaldson, London (GB)

(*) Notice: Subject to any disclaimer, the term of this patent is extended or adjusted under 35 U.S.C. 154(b) by 0 days.

(21) Appl. No.: 13/831,698

(22) Filed: Mar. 15, 2013

(65) Prior Publication Data

US 2014/0273859 A1 Sep. 18, 2014

Related U.S. Application Data

(63) Continuation-in-part of application No. 13/831,447, filed on Mar. 14, 2013.

(51) Int. Cl.
| | |
|---|---|
| *H04B 7/00* | (2006.01) |
| *H04W 4/00* | (2018.01) |
| *H04W 76/00* | (2018.01) |
| *H04W 4/02* | (2018.01) |

(52) U.S. Cl.
CPC .......... *H04W 4/008* (2013.01); *H04W 4/023* (2013.01); *H04W 76/002* (2013.01)

(58) Field of Classification Search
CPC .......... G06Q 30/0267; G06Q 30/0269; G06Q 30/0205; H04L 12/5855; H04L 41/5058; H04L 67/20; H04N 21/43637; H04N 21/440263; H04N 21/4408; H04N 7/106; H04N 7/163; H04N 7/17318; H04N 21/41407

USPC .......... 340/10.1, 10.3, 10.5, 3.1, 5.6, 539.11, 340/540, 541, 539.1, 568.1, 572.1, 573.1, 340/573.4, 7.21; 455/41.1–41.3, 67.11, 455/3.01, 410, 411, 418, 422.1, 442, 436, 455/438, 456.1–456.3

See application file for complete search history.

(56) References Cited

U.S. PATENT DOCUMENTS

| | | | |
|---|---|---|---|
| 2009/0298420 A1* | 12/2009 | Haartsen et al. | 455/3.06 |
| 2013/0045680 A1* | 2/2013 | Dua | 455/41.1 |
| 2013/0331031 A1* | 12/2013 | Palin et al. | 455/41.2 |

* cited by examiner

*Primary Examiner* — Golam Sorowar

(57) ABSTRACT

Techniques associated with intelligent device connection for wireless media ecosystem are described, including detecting, using an antenna implemented in a connection awareness device, a radio signal emitted by a wireless device, generating proximity data indicating a proximity of the wireless device to the antenna, providing the proximity data to an intelligent communication facility coupled to the antenna, determining the proximity passes within a threshold proximity, determining the wireless device is compatible with an output device coupled to the connection awareness device, sending to the wireless device data comprising a query associated with an operation, receiving a response indicating the wireless device is performing the operation, sending a first control signal to the output device, synchronizing a performance of the operation by the output device with another performance of the operation by the wireless device, and sending a second control signal to the wireless device to stop performing the operation.

19 Claims, 10 Drawing Sheets

INTELLIGENT DEVICE CONNECTION FOR WIRELESS MEDIA ECOSYSTEM

CROSS-REFERENCE TO RELATED APPLICATIONS

This application is a continuation-in-part of U.S. patent application Ser. No. 13/831,447, filed Mar. 14, 2013, and entitled "Intelligent Device Connection for Wireless Media Ecosystem," which is incorporated by reference herein in its entirety for all purposes.

FIELD OF THE INVENTION

The invention relates generally to electrical and electronic hardware, computer software, wired and wireless network communications, and computing devices. More specifically, techniques for intelligent device connection for wireless media ecosystem are described.

BACKGROUND OF THE INVENTION

Media content consumers are increasingly mobile, and yet conventional solutions for playing media, such as movies, music and other media content, typically are not well-suited for seamless enjoyment of such media across compatible devices (i.e., devices capable of playing the same media and communicating using a common protocol). In order to enjoy media content across conventional speakers, televisions, tablet computers, other mobile computing devices and portable media devices, manual download of the content is usually required, as well as manual switching of devices (i.e., turn one device or application on, turn another device or application off) and play control (i.e., start, stop, pause, rewind, fast forward). Not only does this require a user to consciously make the decision to switch from one device to another, such as switching from watching a movie on a mobile computing device to watching it on a larger screen television upon entering a room with such a television, but also requires significant manual manipulation of devices by the user in order to stop watching on the one device and to continue watching on another device from where the user left off.

Conventional solutions for playing media also are typically not well-suited for automatic, intelligent set up across a user's compatible devices. Typically, every time a user begins using a device, a manual process of setting up a user's account and preferences is required. Although there are conventional solutions for saving a user's account in the cloud, and downloading content and preferences associated with the account across multiple devices, such conventional solutions typically require a user to download particular software onto a computer (i.e., laptop or desktop), and to synchronize such data manually. A conventional device for playing media typically is not configured to automatically and intelligently communicate user account information, preferences, and current media playing activity information, to another conventional device.

Many conventional devices used for playing media also are used for receiving telephone or video conference calls, and in any given house or office, there can be multiple devices and types of devices configured to receive and connect telephone calls. However, such conventional devices are not well-suited for dynamically determining the availability of compatible devices and transferring automatically the audio and video data for a call from one device to another.

Thus, what is needed is a solution for an intelligent device connection for wireless media ecosystem without the limitations of conventional techniques.

BRIEF DESCRIPTION OF THE DRAWINGS

Various embodiments of the invention are disclosed in the following detailed description and the accompanying drawings.

Figure 1A:
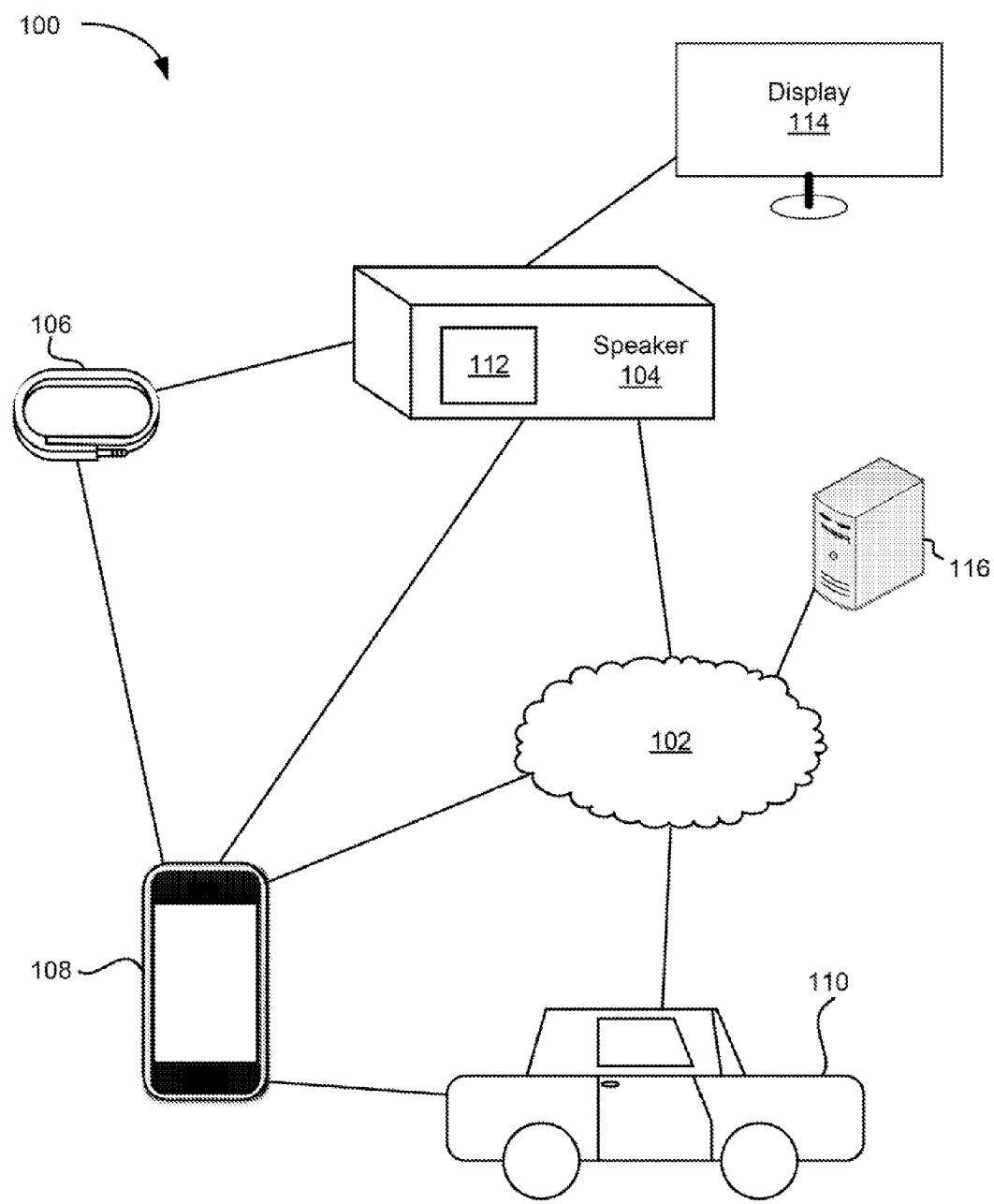
FIGS. 1A-1B illustrates an exemplary system of intelligent wireless media devices.

Although the above-described drawings depict various examples of the invention, the invention is not limited by the depicted examples. It is to be understood that, in the drawings, like reference numerals designate like structural elements. Also, it is understood that the drawings are not necessarily to scale.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, then the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Software and/or firmware implementations may be embodied in a non-transitory computer readable medium configured for execution by a general purpose computing system or the like. The described techniques may be varied and are not limited to the examples or descriptions provided.

Techniques for intelligent device connection for a wireless media ecosystem are described. As described herein, a wireless device may be implemented with a connection awareness device to dynamically connect (i.e., establish a connection using an available connection path, as described herein) with compatible devices, and seamlessly (i.e., substantially continuously or without interruption) transfer a function (e.g., audio or video input/output, media play control, or the like) from one compatible device to another. As used herein, "compatible media device" and "compatible device" may be used interchangeably to refer to one or more devices configured to communicate using at least one common communication protocol (i.e., IEEE 802.11a/b/g/n (WiFi), other wireless local area network (WLAN), WiMax, ANT™, ZigBee®, Bluetooth® (i.e., using a 2.4 GHz frequency band), ultra wideband, near field communication (NFC), mobile broadband (e.g., 4G, 3G or the like), other cellular networks, and the like), and to support at least one common operation, for example, outputting audio and/or video from a telephone call or media file. In some examples, a compatible device may be configured to play at least one common media type or format (e.g., AVI, FLV, WMV, MOV, MP3, MP4, MSV, WAV, SWF, M4V, MJPEG, or the like). In another example, a common operation may be outputting audio from a telephone call. In some examples, a connection awareness device, as described herein, may be configured to determine compatibility, as well as a proximity and location, of a compatible device. In some examples, a connection awareness device also may determine whether various other wireless devices are available and well suited for performing a function associated with an operation (e.g., telephone call, playing a media content, or the like) being performed by a compatible device, and to exchange data associated with said function to said wireless devices and said compatible device to seamlessly transfer said function from one device to another.

Figure 1B:
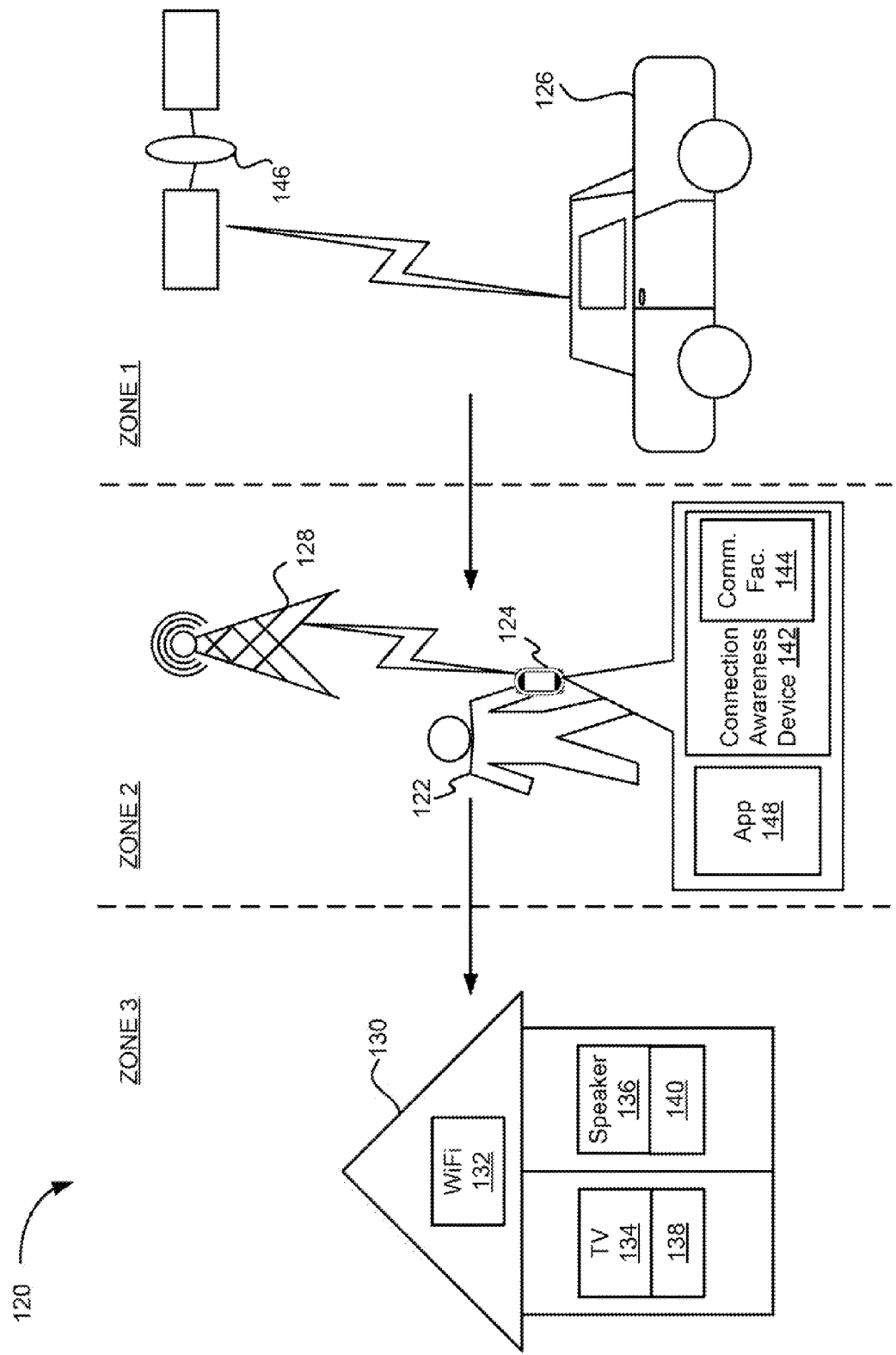

FIG. 1A-1B illustrate exemplary systems of intelligent wireless media devices. Here, system 100 includes network 102, speaker 104, data-capable band (hereinafter "band") 106, mobile device 108, car 110, connection awareness device 112, display 114, and server 116. Here, speaker 104 may include connection awareness device 112 configured to detect proximity and location of a compatible media device and to automatically connect, and exchange data, with the compatible media device, as described herein (see FIGS. 3-4). In some examples, speaker 104 may be implemented as any device configured to output audio, and may include other functional capabilities (e.g., communication functions, device control functions, sensor functions, or the like), as described herein. In some examples, speaker 104 may be configured with a microphone to receive or capture audio input. In some examples, connection awareness device 112 may be configured with various sensors to capture a wide range of environmental data associated with a location of speaker 104, as described herein. In some examples, using connection awareness device 112, speaker 104 may be compatible with band 106, mobile device 108, and display 114. In some examples, speaker 104, band 106, mobile device 108, and various devices in car 110 (e.g., radio, Bluetooth® controller, or other input/output devices) may communicate with each other either directly, or using network 102 (e.g., cloud, Internet, local area network (LAN), cellular, satellite or the like). In some examples, connection awareness devices (not shown) similar to connection awareness device 112 may be implemented in each of data-capable band 106, mobile device 108, car 110, and display 114. In other examples, the quantity, type, function, structure, and configuration of the elements shown may be varied and are not limited to the examples provided.

In some examples, mobile device 108 may include both communication and computing capabilities, as well as media playing capabilities, and be configured for data communication using various types of communications infrastructure, including a wireless network connection (e.g., a wireless network interface card, wireless local area network ("LAN") card, or the like). For example, mobile device 108 may be configured to receive and carry telephone or video conference calls. In another example, mobile device 108 also may be configured with an operating system configured to run various applications (e.g., mobile applications, web applications, and the like), including playing media content (e.g., radio, playlist, other music, movie, online video, other video, and the like) using various types of media players.

In some examples, band 106 may be configured as a portable (i.e., wearable) data capture device. In some examples, band 106 may be configured for data communication using various types of communications infrastructure, including a wireless network connection (e.g., a wireless network interface card, wireless local area network ("LAN") card, or the like). In some examples, band 106 may include various types of sensors (e.g., accelerometer, altimeter/barometer, light/infrared ("IR") sensor, pulse/heart rate ("HR") monitor, audio sensor (e.g., microphone, transducer, or others), pedometer, velocimeter, global positioning system (GPS) receiver, location-based service sensor (e.g., sensor for determining location within a cellular or microcellular network, which may or may not use GPS or other satellite constellations for fixing a position), motion detection sensor, environmental sensor, chemical sensor, electrical sensor, or mechanical sensor, and the like) for collecting local sensor data associated with a user. In some examples, band 106 may communicate sensor data to connection awareness device 112 and/or mobile device 108 for use in generating or modifying a set of user preferences (i.e., preferences associated with playing media or receiving telephone calls) associated with a user.

In some examples, a user may be moving from one area (i.e., car 110) to another area (i.e., a room with speaker 104 and display 114), while listening to, watching, or otherwise enjoying or participating in a media content. In system 100, the user may continuously enjoy or participate in the media content from one compatible device to another compatible device without interruption using connection awareness device 112, and other connection awareness devices that may be implemented on compatible devices, which may determine a proximity and location of a compatible device using a radio antenna and an intelligent communication facility, as described herein (see FIGS. 3-4). For example, a user may begin playing a playlist of songs in car 110 using mobile device 108 (e.g., mobile device 108 may play a playlist stored on mobile device 108, mobile device 108 may be accessing a playlist stored on server 116 using network 102, or the like) while driving. In this example, when a user exits car 110 and a connection between mobile device 108 and car 110 is lost (i.e., power in car 110 is turned off or mobile device 108 exceeds a threshold distance or proximity away from car 110), mobile device 108 may continue to play the playlist without interruption (i.e., substantially continuously, continuing at the same or substantially similar point in the playlist as when mobile device 108 lost a connection with car 110), for example, using speakers implemented on mobile device 108 or other output device (e.g., headphones, headset, or the like). In this example, a connection awareness device (not shown), similar to connection awareness device 112 and other connection awareness devices described herein, may prompt the continuous, or substantially continuous, play of the playlist and direct the audio output to an available output device (e.g., said speakers, headphones, headset, or the like) automatically upon a loss of connection between mobile device 108 and car 110.

In another example, as a user carries mobile device 108 into a room while playing said playlist (or other media content) and comes within a threshold proximity of speaker 104, connection awareness device 112 may determine a proximity and a location of mobile device 108, and also may determine that mobile device 108 is a compatible device. In some examples, connection awareness device 112 also may determine that mobile device 108 is playing media content (i.e., the playlist) suitable, or better suited, to be played by speaker 104, and communicate with speaker 104 and mobile device 108 to continue playing the playlist on speaker 104 without interruption (e.g., connection awareness device 112 may send data to speaker 104 prompting speaker 104 to play the playlist beginning at a point in the playlist directly after or substantially at a point in the playlist to which mobile device 108 already has played, connection awareness device 112 may send data to mobile device 108 prompting mobile device 108 to discontinue outputting the media content to a prior output device (e.g., speakers implemented on mobile device 108, headphones, headset, or the like), connection awareness device 112 may receive data associated with the media content from mobile device 108, and/or connection awareness device 112 may send and receive other data to and from mobile device 108 and speaker 104). In some examples, a determination that speaker 104 is better suited to play media content may include determining whether there is another media content already being played by speaker 104, whether there are other compatible devices also in close proximity playing different media content, and/or whether other compatible devices also in close proximity are sending data to speaker 104 for output. In yet another example, a user may carry mobile device 108 into a room with speaker 104 and display 114 while playing video content suitable, or better suited, to be played by display 114. In this example, connection awareness device 112 may obtain data from mobile device 108 associated with the media content being played, and send data to display 114 prompting display 114 to turn on and to continue playing said video content without interruption. In this example, connection awareness device 112 also may send data to mobile device 108 prompting mobile device 108 to discontinue outputting the video to its own display. In other examples, some or all of these functions may be performed by another similar connection awareness device implemented on mobile device 108, in cooperation with speaker 104.

In still another example, a user may carry mobile device 108 into a room with speaker 104 while carrying on a telephone or video conference call using mobile device 108. Connection awareness device 112 may determine that mobile device 108 is within a threshold proximity to speaker 104 and/or display 114, and also may determine that mobile device 108 is a compatible device. In some examples, connection awareness device 112 also may determine that that speaker 104 and/or display 114 may be better suited to output the audio and/or video from the telephone or video conference call being conducted using mobile device 108, and may communicate with mobile device 108 speaker 104 and/or display 114 to output the call audio and/or video to speaker 104 and/or display 114 (e.g., connection awareness device 112 may send and receive data associated with audio and video output associated with the call to and from mobile device 108, connection awareness device 112 may send data associated with said audio and video output to speaker 104 and display 114, and connection awareness device 112 may send and receive other data associated with the call to and from mobile device 108, speaker 104 and display 114). In still other examples, the quantity, type, function, structure, and configuration of the elements shown may be varied and are not limited to the examples provided.

FIG. 1B illustrates another exemplary system of intelligent wireless media devices. Here, system 120 includes user 122, mobile device 124, car 126, cell tower 128, house 130, WiFi router 132, television 134, speaker 136, connection awareness devices 138-142, communications facility 144, satellite 146 and application 148. Like-numbered and named elements may describe the same or substantially similar elements as those shown in other descriptions. In some examples, television 134 and speaker 136 may be implemented as any device capable of audio, video and/or other output (i.e., output devices). In some examples, connection awareness device 138 may be coupled to television 134, and connection awareness device 140 may be coupled to speaker 136. In some examples, connection awareness device 142 may be implemented in mobile device 124, and may include communications facility 144. In some examples, communications facility 144 may be implemented similarly to an intelligent communication facility (e.g., intelligent communication facility 308 in FIG. 3, intelligent communication facility 400 in FIG. 4, or the like), as described herein. In some examples, mobile device 124 also may implement application 148, configured to perform an operation, for example, streaming satellite radio, that car 126 also is configured to perform. In some examples, user 122 may move through various zones, each zone providing a different device with different connection capabilities for performing an operation or function. For example, in Zone 1, car 126 may have various communication capabilities (e.g., satellite, Bluetooth®, NFC, or the like), and may be streaming radio using satellite 146. As user 122 moves away from car 126, mobile device 124 may detect an increase in distance (i.e., decrease in proximity) from car 126, and using connection awareness device 142, may access data from car 126 to determine which media content is being played by car 126, for example, a satellite radio content. In some examples, said data from car 126 may include an indication of a point in the media content at which to pick up playing (e.g., using a marker, as described herein). In some examples, connection awareness device 142, using communication facility 144, may provide said data associated with said satellite radio content to application 148, which may be configured to access the same satellite radio station using a mobile broadband connection provided by cell tower 128 in Zone 2.

In another example, in Zone 3, house 130 may be equipped with WiFi router 132, using which television 134, speaker 136, and other devices in house 130, may access the Internet, satellite, or other remote data. As user 122 moves from Zone 2 into Zone 3, for example, into a room with speaker 136 and connection awareness device 140, connection awareness devices 140 and 142 may detect an increasing proximity between mobile device 124 and speaker 136. In some examples, connection awareness device 140 and/or 142 also may determine that speaker 136 is well suited to perform an operation (e.g., playing satellite radio content, and outputting audio, or the like) being performed by mobile device 124 using application 148, and that speaker 136 also has an available connection path (i.e., using WiFi router 132) for accessing remote data associated with said operation. In some examples, connection awareness device 140 and/or 142 may exchange data between mobile device 124 and speaker 136 to transfer said operation, for example, playing satellite radio content, from mobile device 124 to speaker 136, and to synchronize them (see FIG. 4B) for user 122's uninterrupted enjoyment of the media content.

In yet other examples, mobile device 124 may be using application 148 to play media content involving both video and audio output (e.g., a movie, television show, online video, or the like). User 122 may move into a room where mobile device 124 and television 134 may come within a threshold proximity (e.g., close enough to exchange data associated with the media content being played), or mobile device 124 may cross within said threshold proximity, and connection awareness device 138 may detect the proximity and location of mobile device 124. In some examples, once connection awareness device 138 detects a proximity and compatibility of mobile device 124, connection awareness device 138 may be prompted automatically to exchange data with mobile device 124, as described herein, to determine whether mobile device 124 is performing an operation for which television 134 may be better suited to perform, and to access data from mobile device 124 to transfer said operation, for example, playing a video, from mobile device 124 to television 134, and to synchronize them (see FIG. 4B) for user 122's uninterrupted enjoyment of the media content. In other examples, the quantity, type, function, structure, and configuration of the elements shown may be varied and are not limited to the examples provided.

Figure 2:
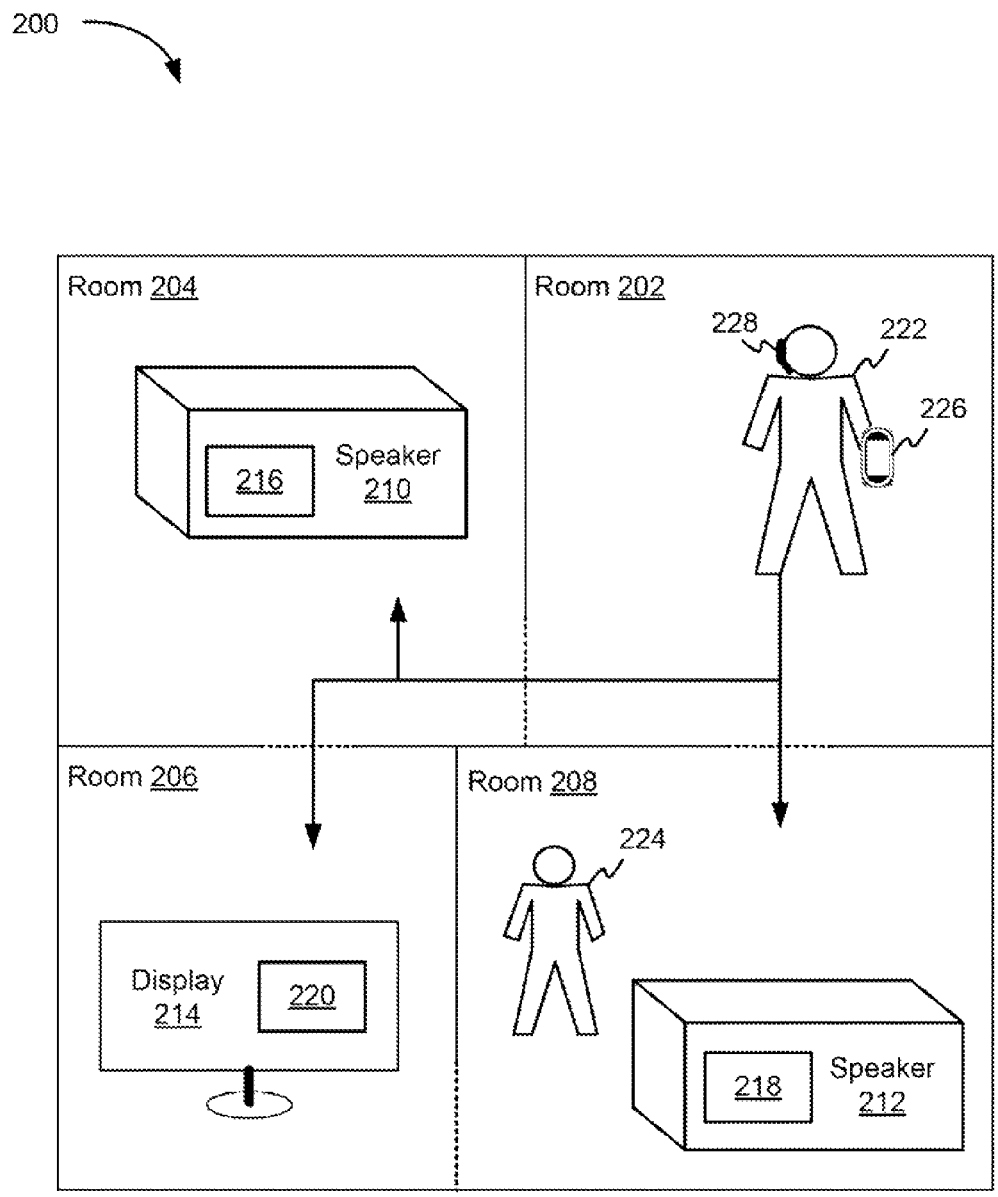
FIG. 2 illustrates another exemplary system of intelligent wireless media devices

FIG. 2 illustrates another exemplary system of intelligent wireless media devices. Here, system 200 includes room 202-208, speakers 210-212, display 214, connection awareness devices 216-220, users 222-224, mobile device 226 and headset 228. Like-numbered and named elements may describe the same or substantially similar elements as those shown in other descriptions. In some examples, user 222 may move from room to room (e.g., rooms 202-208) carrying mobile device 226, and experience media content being played using mobile device 226 on various output devices (e.g., speakers 210-212 and display 214) as user 222 comes into proximity with each of the various output devices. In an example, when user 22 walks from room 202 to room 204 and carries mobile device 226 within a threshold proximity of speaker 210, connection awareness device 216 may determine whether mobile device 226 is a compatible device, as described herein, further determine whether mobile device 226 is playing music (e.g., a playlist, album, or the like), and exchange data with mobile device 226 and speaker 210 to switch audio output for said music to speaker 210 (i.e., without interruption, as described herein). In another example, when user 222 walks into room 204 while on a telephone call using mobile device 226 with audio input/output to headset 228, connection awareness device 216 may exchange data with mobile device 226 to determine compatibility, as described herein, further determine there is no one else in room 204, and exchange data with mobile device 226 and speaker 210 to transfer the call's audio input/output function to speaker 210. In still another example, when user 222 walks into room 206 while on a video call using mobile device 226, connection awareness device 220 may exchange data with mobile device 226 to determine compatibility, as described herein, further determine there is no one else in room 204, and exchange data with mobile device 226 and display 214 to transfer the call's video input/output function to display 214 (i.e., without interruption, as described herein). In some examples, display 214 also may be configured with compatible audio input/output capabilities, in which case connection awareness device 220 also may exchange data with mobile device 226 and display 214 to transfer the call's audio input/output function to display 214 as well. In yet another example, when user 222 walks into room 208 while on a telephone call using mobile device 226 with audio input/output to headset 228, connection awareness device 218 may exchange data with mobile device 226 to determine compatibility, as described herein, and further determine that another person (i.e., user 224) is in the room. In some examples, connection awareness device 218 may be configured with one or more sensors (e.g., sensor 318 in FIG. 3) for determining a presence of another person in a room, as described herein. In other examples, connection awareness device 218 may be configured to determine a presence of another person in a room by detecting a wireless device (not shown) configured with a user profile, as described below, associated with a different user (e.g., user 224). In some examples, connection awareness device 218 may determine based on a presence of user 224 in room 208 that speaker 212 is not well suited for outputting audio from user 222's telephone call. In other examples, connection awareness device 218 further may be configured to determine that speaker 212 already is in use (i.e., outputting other audio), and thus is not available or suitable to output audio associated with user 222's telephone call. In still other examples, the quantity, type, function, structure, and configuration of the elements shown may be varied and are not limited to the examples provided.

Figure 3:
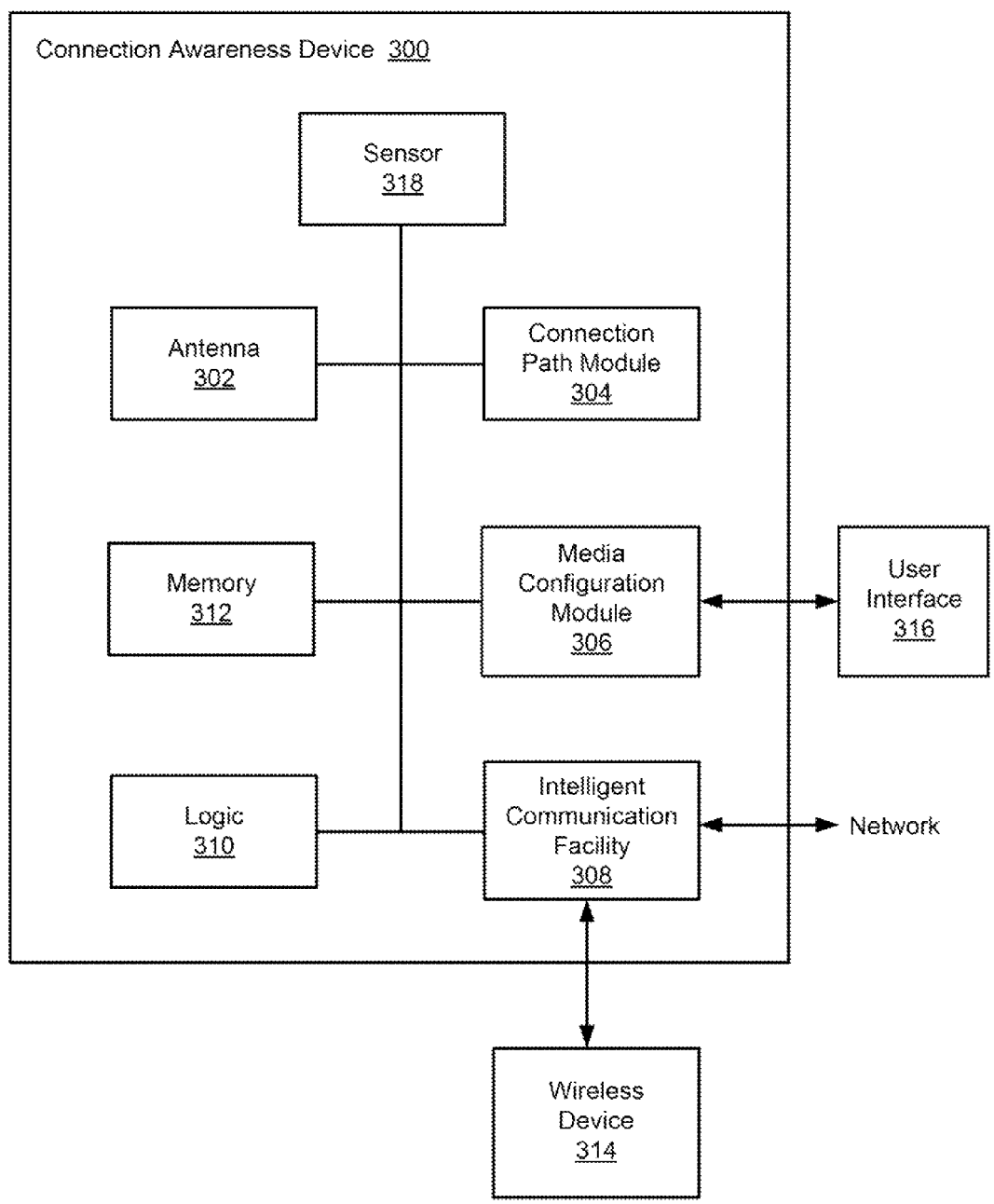
FIG. 3 illustrates an exemplary architecture for a connection awareness device.

FIG. 3 illustrates an exemplary architecture for a connection awareness device. Here, connection awareness device 300 includes antenna 302, connection path module 304, media configuration module 306, intelligent communication facility 308, logic 310, memory 312, sensor 318, and may be configured to communicate with wireless device 314 and user interface 316. Like-numbered and named elements may describe the same or substantially similar elements as those shown in other descriptions. In some examples, antenna 302 may be configured to detect, sense or receive radio signals or energy (i.e., electromagnetic radiation), for example, emitted from wireless device 314 or other wireless device (e.g., mobile device 108, band 106 and display 114 in FIG. 1, speakers 210-212, display 214, mobile device 226 and headset 228 in FIG. 2, or the like). In some examples, wireless device 314 may be any device capable of communicating with another device using radio signals, including accessing a network (e.g., network 102 in FIG. 1). In some examples, wireless device 314 may be a compatible device, as described herein. In some examples, antenna 302 may be implemented as a receiver, transmitter, or transceiver, configured to detect and generate radio waves, for example, to and from electrical signals. In some examples, antenna 302 may be configured to detect radio signals across a broad spectrum, including licensed and unlicensed bands (e.g., WiFi, Bluetooth®, NFC, ultra wideband, or other bands). In some examples, antenna 302 may be configured to generate data associated with a radio signal or energy from wireless device 314, or other wireless devices (e.g., speaker 104, band 106, mobile device 108 and display 114 in FIG. 1, speakers 210-212, display 214, mobile device 226 and headset 228 in FIG. 2, and the like), including proximity data (i.e., data associated with a proximity of wireless device 314) and location data (i.e. data associated with a location (e.g., direction, position, for example, in a room, in another environment, or in reference to an antenna or other device, and the like) of wireless device 314). In some examples, antenna 302 may determine a proximity of wireless device 314 using an strength (i.e., intensity or magnitude) of a radio signal or energy emitted by wireless device 314, for example, as may be caused by a wireless data exchange being performed by wireless device 314 (e.g., downloading an electronic mail message ("email"), receiving a push notification, sensing a Bluetooth® or WiFi signal, or the like). In some examples, antenna 302 may be configured to generate, and communicate to intelligent communication facility 308, data associated with a proximity and location of wireless device 314. As used herein, "facility" refers to any, some, or all of the features and structures that are used to implement a given set of functions (see, e.g., intelligent communication facility 400 in FIG. 4). In some examples, intelligent communication facility 308 may be configured to communicate with wireless device 314 automatically once wireless device 314 crosses or passes within a certain threshold proximity of connection awareness device 300, and makes this threshold proximity determination using data gathered by antenna 302.

In some examples, connection path module 304 may be configured to determine available connection paths (i.e., WiFi, other WLAN, WiMax, ANT™, ZigBee®, Bluetooth®, ultra wideband, NFC, mobile broadband, other cellular networks, and the like). As used herein, the terms "connection path" and "communication path" may be used interchangeably to refer to a path, mode, method, or protocol for sending, receiving, or otherwise exchanging data, for example, wirelessly. In an example, connection path module 304 may be configured to detect the availability of a WiFi network, Bluetooth® network, cellular network, or other wireless networks. In some examples, connection path module 304 may be configured to detect multipoint connection paths, for example, connection paths using two or more networks. For example, connection path module 304 may determine that connection awareness device 300 is in a Bluetooth® hotspot (i.e., a Bluetooth® network is readily accessible to connection awareness device 300), and also determine that another network (e.g., WiFi, ultra wideband, or the like), which may better serve the data exchange requirements of connection awareness device 300 (or another device coupled to connection awareness device (not shown)), may be accessible using the Bluetooth® network. In another example, NFC may be used to establish a Bluetooth® connection. In some examples, connection path module 304 may be configured to detect and adjust to changing connection paths when different connection paths become available to connection awareness device 300. For example, if a WiFi network disappears, but a different network becomes available (e.g., cellular, ultra wideband, or the like), connection path module 304 may dynamically change from a connection path to another connection path, including adjusting one or more connections in a multipoint connection path, as connection awareness device 300 continues to exchange or stream data.

In some examples, media configuration module 306 may be configured to generate, capture or otherwise obtain media preferences associated with a user. In some examples, a set of media preferences may be generated and stored (e.g., in memory 312 in FIG. 3, or in memory 506 or storage device 508 in FIG. 5, or the like) in association with a user account (i.e., with a user). A user account may include a user profile, which may include a user's media preferences. In some examples, identification data associated with a user also may be stored with a user profile or user account.

In some examples, media configuration module 306 may generate user preferences using user interface 316, which may be implemented on a device coupled to connection awareness device 300. For example, connection awareness device 300 may be coupled to a speaker (e.g., speaker 104 in FIG. 1, speakers 210-212 in FIG. 2, or the like) or other output device (e.g., display 114 or mobile device 108 in FIG. 1, display 214 or mobile device 226 in FIG. 2, or the like), which may implement user interface 316 using audio (e.g., questions asked and answered audibly, other noise prompts, or the like), visual (e.g., using LED, touchscreen or other types of interactive displays), or tactile (e.g., buttons, switches and the like) cues and prompts, or any combination thereof. In other examples, media configuration module 306 may be configured to receive data from intelligent communication facility 308 associated with wireless device 314, and with user preferences stored or accessed by wireless device 314. In this example, media configuration module 306 may be configured to determine automatically, using intelligent communication facility 308, whether wireless device 314 has access to any user preference data not already generated or captured by media configuration module 306 for a user, and to automatically download any such new user preference data. For example, when a user creates a playlist, or otherwise indicate new song preferences, using wireless device 314, media configuration module 306 may access or download said playlist and new song preferences using intelligent communication facility 308 when wireless device 314 crosses or passes within a threshold proximity of connection awareness device 300. In still other examples, media configuration module 306 may generate user preferences using sensor 318, which may include one or more sensors configured to capture data associated with a user's location and environment (e.g., light/infrared ("IR") sensor, audio sensor (e.g., microphone, transducer, or others), global positioning system (GPS) receiver, location-based service sensor (e.g., sensor for determining location within a cellular or micro-cellular network, which may or may not use GPS or other satellite constellations for fixing a position), motion detection sensor, environmental sensor, chemical sensor, or the like). For example, media configuration module 306 may use sensor 318 to determine that connection awareness device 300 is located in a user's home, and also to capture data associated with various aspects of the user's home, including noise level, types of sounds, levels of light, motion activity, or other environmental characteristics. Such data also may be used by media configuration module 306 to inform various user media preferences (e.g., brightness level for playing video content, volume level for playing audio content, or the like). In some examples, user preferences generated, captured, downloaded, or otherwise obtained by media configuration module 306 may be saved in memory 312 or in other storage (e.g., memory 506 or storage device 508 in FIG. 5). In still other examples, the quantity, type, function, structure, and configuration of the elements shown may be varied and are not limited to the examples provided.

In some examples, intelligent communication facility 308 may be configured to communicate automatically with compatible devices, including determining whether another device (e.g., wireless device 314) is compatible. For example, intelligent communication facility 308 may receive data from antenna 302 indicating that wireless device 314 is within a threshold proximity of connection awareness device 300, or an output device (e.g., speaker 104 and display 114 in FIG. 1, speakers 210-212 and display 214 in FIG. 2, media player 418 in FIG. 4, or the like) coupled to connection awareness device 300, which may automatically prompt intelligent communication facility 308 to send data to wireless device 314 to determine compatibility (e.g., to determine whether wireless device 314 has common communication capabilities, which types of communication capabilities wireless device 314 has in common with connection awareness device 300, whether wireless device 314 and connection awareness device 300 (or any device coupled to connection awareness device 300) have any common operational capabilities (e.g., connecting a telephone or video call, outputting audio or video from a telephone or video call, playing a type of media, or the like), operate any common or compatible software, and the like). In some examples, upon determining wireless device 314 to be a compatible device, intelligent communication facility 308 also may be configured to exchange data automatically with wireless device 314 to determine any current operation being performed by wireless device 314 (e.g., a telephone or video call, playing music, playing a movie or other video, and the like), and also to determine whether another output device (e.g., speaker 104 and display 114 in FIG. 1, speakers 210-212 and display 214 in FIG. 2, media player 418 in FIG. 4, or the like) may be better suited to perform a function associated with the operation being performed by wireless device 314 (e.g., output audio, output video, connect a call to an ongoing conference call, or the like). In some examples, intelligent communication facility 308 may be configured to make a determination whether an available output device is better suited to perform a function associated with an operation being performed by wireless device 314 using data generated by antenna 302, connection path module 304, media configuration module 306 and sensor 318. For example, antenna 302 may provide data indicating other wireless devices also are within a threshold proximity, which may prompt intelligent communication facility 308 to determine whether such other wireless devices are being used by different users, indicating a presence of other people. In another example, a presence of other people in a room may be determined using sensor 318, which may capture data indicating a high level of motion. In still other examples, the quantity, type, function, structure, and configuration of the elements shown may be varied and are not limited to the examples provided.

In some examples, upon determining that an available output device may be better suited to perform a function associated with an operation being performed by wireless device 314, intelligent communication facility 308 may be configured to exchange data with wireless device 314 and with an available output device (e.g., speaker 104 and display 114 in FIG. 1, speakers 210-212 and display 214 in FIG. 2, media player 418 in FIG. 4, or the like) to transfer said function from wireless device 314 to said available output device. For example, intelligent communication facility 308 may send data to said available output device to turn on a desired functionality, obtain output data from wireless device 314 associated with an operation being performed, and route said output data to said available output device. In some examples, intelligent communication facility 308 may be configured to use data from sensor 318 to determine a volume level, brightness level, or other characteristic associated with said output data being routed to said available output device. For example, sensor 318 may capture data associated with light and noise levels in a room, which may indicate a time of day or level of activity (e.g., if a noise level in a room is low, intelligent communication facility 308 may adjust a volume of audio output from a speaker, or if a light level in a room is low, intelligent communication facility 308 may adjust a brightness of video output from a display, and the like).

Figure 5:
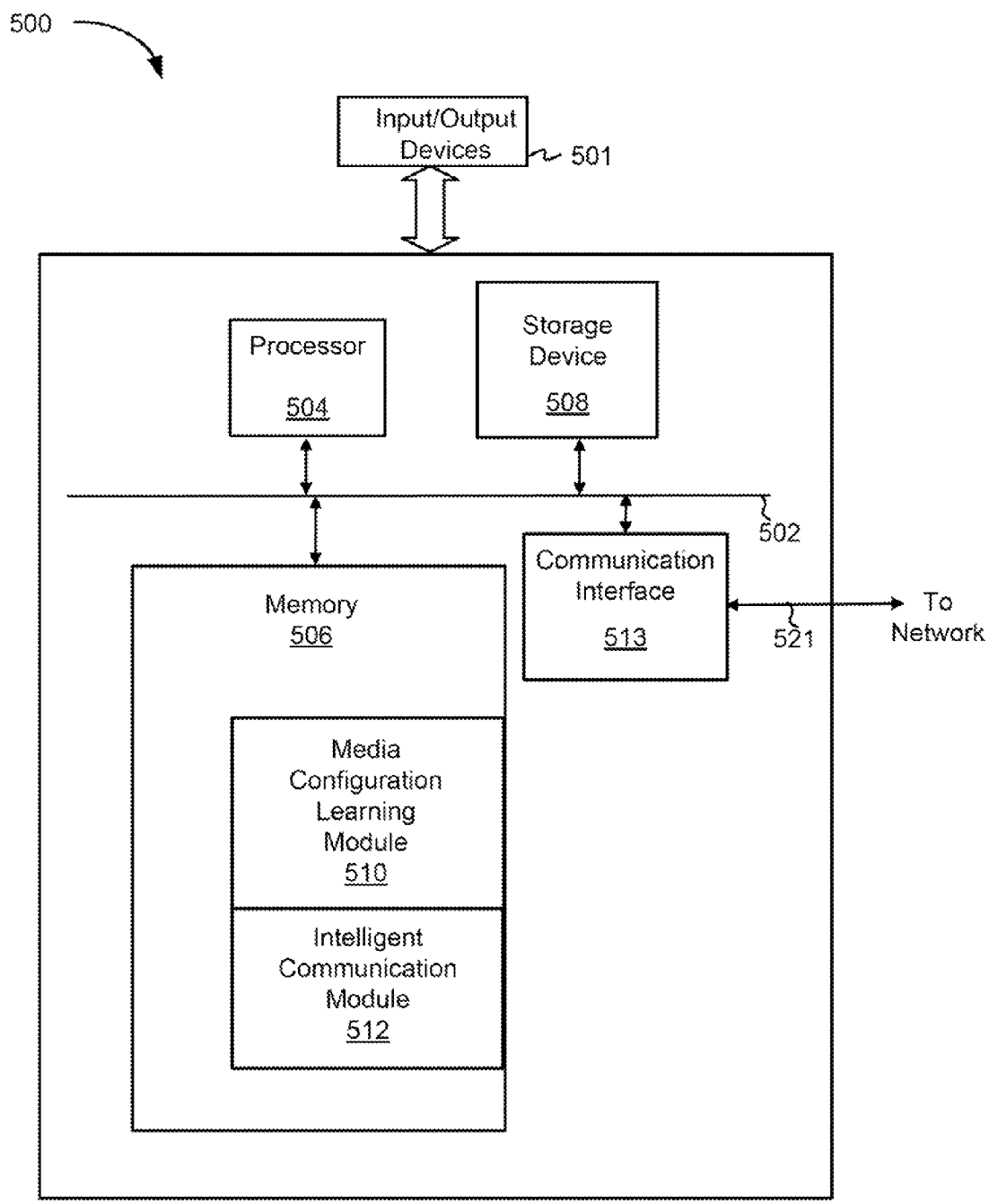
FIG. 5 illustrates an exemplary computing platform disposed in or associated with an connection awareness device.

In some examples, logic 310 may be implemented as firmware or application software that is installed in a memory (e.g., memory 312, memory 506 in FIG. 5, or the like) and executed by a processor (e.g., processor 504 in FIG. 5). Included in logic 310 may be program instructions or code (e.g., source, object, binary executables, or others) that, when initiated, called, or instantiated, perform various functions. In some examples, logic 310 may provide control functions and signals to other components of connection awareness device 300, including to antenna 302, connection path module 304, media configuration module 306, intelligent communication facility 308, sensor 318, or other components. For example, logic 310 may be configured to send control signals to intelligent communication facility 308 to transfer, transmit, or receive data, to and from antenna 302, connection path module 304, media configuration module 306, or a memory (e.g., memory 312, memory 506 in FIG. 5, or the like). In other examples, the quantity, type, function, structure, and configuration of the elements shown may be varied and are not limited to the examples provided.

Figure 4A:
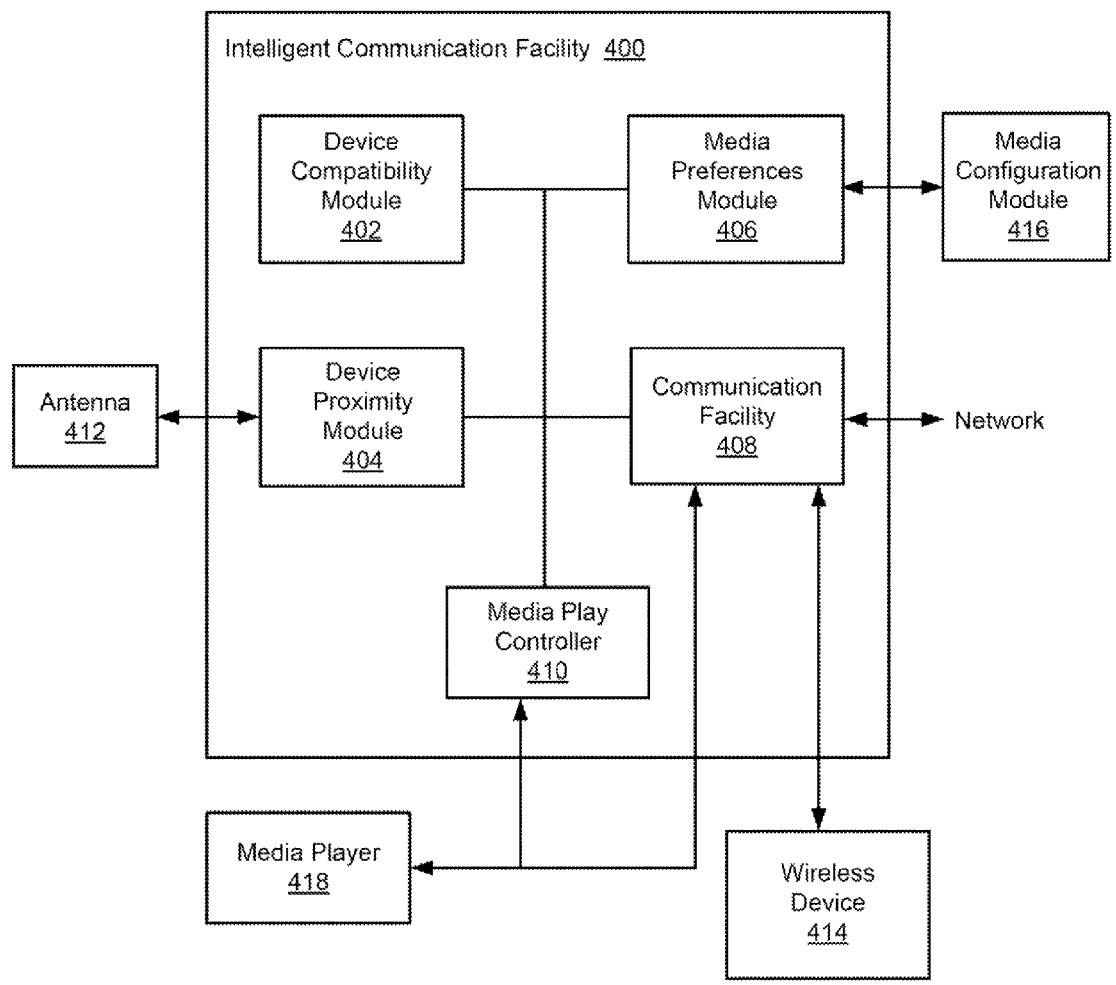
FIG. 4A illustrates an exemplary architecture for an intelligent communication facility.

FIG. 4A illustrates an exemplary architecture for an intelligent communication facility. Here, intelligent communication facility 400 includes device compatibility module 402, device proximity module 404, media preferences module 406, communication facility 408, media play controller 410, and may be configured to communicate or interface with antenna 412, wireless device 414, media configuration module 416 and media player 418. Like-numbered and named elements may describe the same or substantially similar elements as those shown in other descriptions. In some examples, device proximity module 404 may be configured to determine whether wireless device 414 (or other wireless device, as described herein) has crossed a threshold proximity, using data from antenna 412 (i.e., implemented in a connection awareness device, as described herein) indicating a proximity and/or location of wireless device 414. In some examples, device proximity module 404 may be configured to determine whether wireless device 414 is entering within a proximity threshold (i.e., coming closer) or exiting a proximity threshold (i.e., moving away). In some examples, device compatibility module 402 may be configured to compare data received from wireless device 414 associated with communication and operational capabilities of wireless device 414 with data associated with communication and operational capabilities of other available wireless devices coupled to intelligent communication facility 400 (e.g., media player 418, or other wireless devices, as described herein). For example, device compatibility module 402 may receive data indicating wireless device 414 has WiFi communication capabilities and compare such data with stored data indicating intelligent communication facility 400 also has WiFi communication capabilities to determine that intelligent communication facility 400 and wireless device 414 are compatible to exchange data. In another example, device compatibility module 402 may access data indicating wireless device 414 has an ability to play a video format and that media player 418 also has an ability to play a video format to determine that wireless device 414 and media player 418 are compatible to output video using said video format. In other examples, the quantity, type, function, structure, and configuration of the elements shown may be varied and are not limited to the examples provided.

In some examples, media preferences module 406 may be configured to exchange media preference data with media configuration module 416 (i.e., implemented in a connection awareness device, as described herein). In some examples, media preferences module 406 may be configured to obtain data associated with media preferences stored or accessible by wireless device 414, and to route such data to media configuration module 416 for processing. In some examples, media preferences module 406 may be prompted by media configuration module 416 to exchange data associated with a user's media preferences with wireless device 414. In some examples, various exchanges of data between intelligent communication facility 400 and other devices (e.g., wireless device 414, media player 418, and the like) may be carried out using communication facility 408. For example, communications facility 408 may include a wireless radio, control circuit or logic, antenna, transceiver, receiver, transmitter, resistors, diodes, transistors, or other elements that are used to transmit and receive data. In some examples, communications facility 408 may be implemented to provide a wireless data communication capability to transmit digitally encoded data across one or more frequencies using various types of data communication protocols, without limitation.

In some examples, media play controller 410 may be configured to generate and send control signals to media player 418, the control signals configured to turn on and control desired functionality for playing media content. For example, media play controller 410 may obtain data from wireless device 414 associated with media content being played by wireless device 414, the data including a marker indicating, a point in, or a portion, of the media content being played by the wireless device. In some examples, media play controller 410 may be configured to send data to media player 418, the data including the media content and the marker, and configured to cause the media player to begin playing the media content at a point indicated by the marker. In some examples, media play controller 410 may exchange data with media player 418 through communication facility 408. In other examples, wireless device 414 may maintain play control of a media content being played, and communication facility 408 may be configured to route audio and video output data from wireless device 414 to media player 418. In still other examples, the quantity, type, function, structure, and configuration of the elements shown may be varied and are not limited to the examples provided.

Figure 4B:
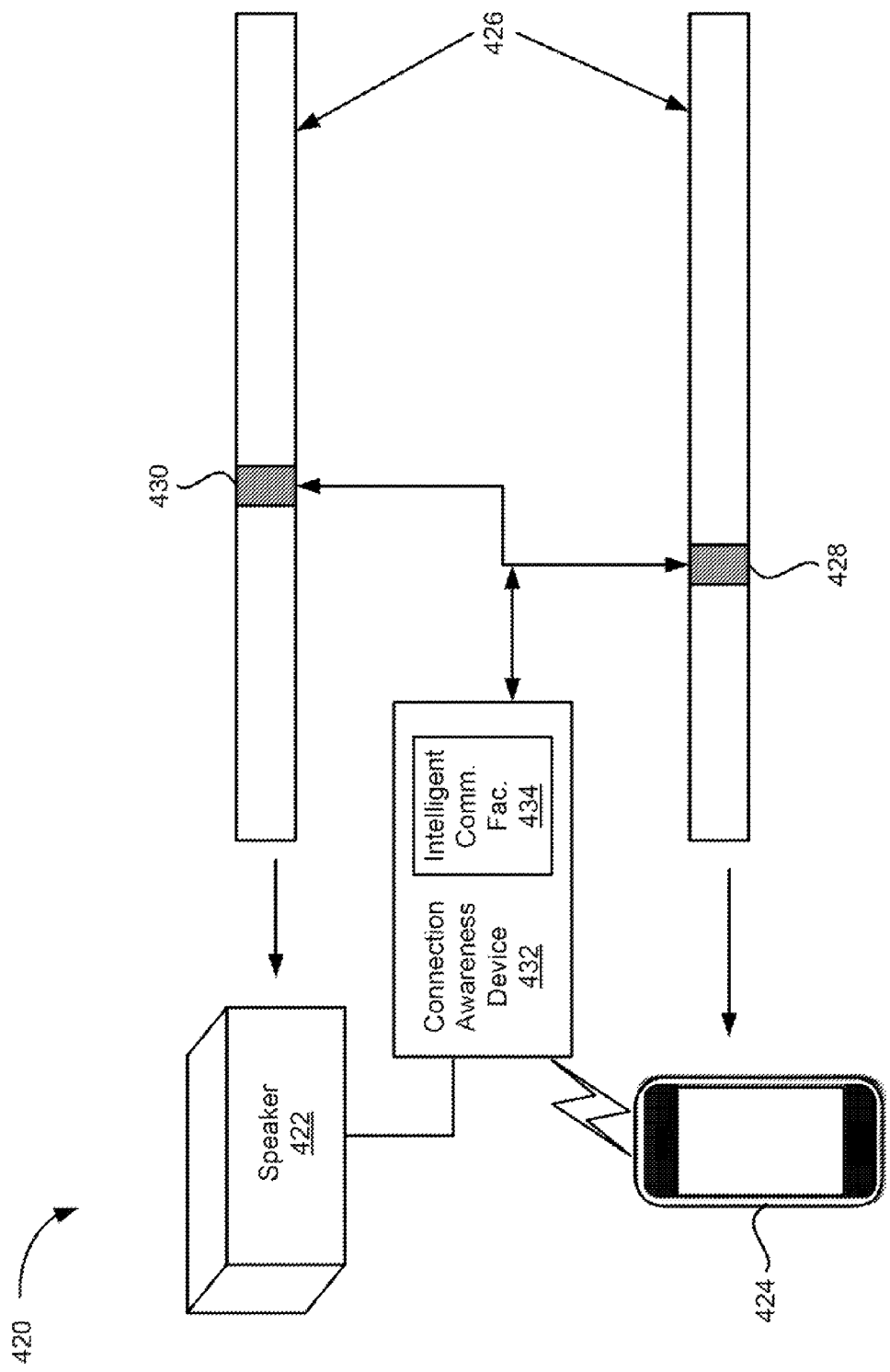
FIG. 4B illustrates an exemplary synchronization of two devices for handing off an operation.

FIG. 4B illustrates a diagram of an exemplary synchronization of two devices for handing off an operation. Here, diagram 420 includes speaker 422, mobile device 424, media content 426, media content portions 428 and 430, connection awareness device 432, and intelligent communications facility 434. In some examples, connection awareness device 432 may be coupled to, or implemented with, speaker 422. In some examples, speaker 422 may be implemented as any device operable to output audio data. In other examples, mobile device 424 may be synchronized with a different type of device, for example, a television, a display, or other output device. In some examples, connection awareness device 432 may be in data communication with mobile device 424, and may be configured to synchronize mobile device 424 with speaker 422 to seamlessly (i.e., without interruption) transfer the data streaming operation from mobile device 424 to speaker 422. For example, mobile device 424 may be streaming media content 426, and media content portion 428 may represent the portion of media currently being played or buffered by mobile device 424. In this example, data provided to mobile device 424 from a source of media content 426 may include a marker indicating a point in, or portion of, media content 426 represented by media content portion 428 (i.e., indicating a point in media content 426 being played, or about to be played (e.g., within a predetermined range of milliseconds, nanoseconds, picoseconds, or other predetermined range of time), by mobile device 424), or otherwise describing media content portion 428. In some examples, intelligent communication facility 434 may include a controller (e.g., media play controller 410, or the like) configured to send a control signal to speaker 422 to begin performing an operation, for example, streaming media content 426. In an example, speaker 422 may pick up streaming media content 426 at media content portion 430. In some examples, intelligent communication facility 434 may be configured to access data from mobile device 424 associated with media content portion 428 (i.e., including a marker associated with media content portion 428) and to synchronize the media content being streamed by speaker 422 (e.g., media content portion 430) with media content portion 428 (e.g., by delaying speaker 422's playing of media content portion 430 until a marker associated with media content portion 430 is reached by mobile device 424, or the like), such that speaker 422 picks up streaming the media content from mobile device 424 without interruption. In some examples, intelligent communication facility 434 also may be configured to send a control signal to mobile device 424 to stop playing and/or streaming said media content picked up by speaker 422. In other examples, the quantity, type, function, structure, and configuration of the elements shown may be varied and are not limited to the examples provided.

FIG. 5 illustrates an exemplary computing platform disposed in or associated with a connection awareness device. In some examples, computing platform 500 may be used to implement computer programs, applications, methods, processes, algorithms, or other software to perform the above-described techniques. Computing platform 500 includes a bus 502 or other communication mechanism for communicating information, which interconnects subsystems and devices, such as processor 504, system memory 506 (e.g., RAM, etc.), storage device 508 (e.g., ROM, etc.), a communication interface 513 (e.g., an Ethernet or wireless controller, a Bluetooth controller, etc.) to facilitate communications via a port on communication link 521 to communicate, for example, with a computing device, including mobile computing and/or communication devices with processors. Processor 504 can be implemented with one or more central processing units ("CPUs"), such as those manufactured by Intel® Corporation, or one or more virtual processors, as well as any combination of CPUs and virtual processors. Computing platform 500 exchanges data representing inputs and outputs via input-and-output devices 501, including, but not limited to, keyboards, mice, audio inputs (e.g., speech-to-text devices), user interfaces, displays, monitors, cursors, touch-sensitive displays, LCD or LED displays, speakers, media players and other I/O-related devices.

According to some examples, computing platform 500 performs specific operations by processor 504 executing one or more sequences of one or more instructions stored in system memory 506, and computing platform 500 can be implemented in a client-server arrangement, peer-to-peer arrangement, or as any mobile computing device, including smart phones and the like. Such instructions or data may be read into system memory 506 from another computer readable medium, such as storage device 508. In some examples, hard-wired circuitry may be used in place of or in combination with software instructions for implementation. Instructions may be embedded in software or firmware. The term "computer readable medium" refers to any non-transitory medium that participates in providing instructions to processor 504 for execution. Such a medium may take many forms, including but not limited to, non-volatile media and volatile media. Non-volatile media includes, for example, optical or magnetic disks and the like. Volatile media includes dynamic memory, such as system memory 506.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 502 for transmitting a computer data signal.

In some examples, execution of the sequences of instructions may be performed by computing platform 500. According to some examples, computing platform 500 can be coupled by communication link 521 (e.g., a wired network, such as LAN, PSTN, or any wireless network) to any other processor to perform the sequence of instructions in coordination with (or asynchronous to) one another. Computing platform 500 may transmit and receive messages, data, and instructions, including program code (e.g., application code) through communication link 521 and communication interface 513. Received program code may be executed by processor 504 as it is received, and/or stored in memory 506 or other non-volatile storage for later execution.

In the example shown, system memory 506 can include various modules that include executable instructions to implement functionalities described herein. In the example shown, system memory 506 includes a media configuration learning module 510 configured to determine media preferences using input from various sources, including sensors (e.g., sensors 314 in FIG. 3, or as may be implemented in band 106 in FIG. 1, or the like), manual input (i.e., using a user interface), or from compatible devices, as described herein. System memory 506 also may include intelligent communication module 512, which may be configured to provide one or more of the intelligent communication functions described herein (see, e.g., intelligent communication facilities 308 and 400 in FIGS. 3-4).

In some embodiments, speaker 104, band 106 and mobile device 108 of FIG. 1 can communicate (e.g., wired or wirelessly) with each other, or with other compatible devices. In some cases, mobile device 108, speaker 104, band 106, display 114, or any networked computing device (not shown) in communication with wearable device 106 or mobile device 108, can provide at least some of the structures and/or functions of any of the features described herein. As depicted in FIGS. 1-4 herein, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in FIGS. 1-4 can represent one or more algorithms. Or, at least one of the elements can represent a portion of logic including a portion of hardware configured to provide constituent structures and/or functionalities.

As hardware and/or firmware, the structures and techniques described herein can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, intelligent communication module 512, including one or more components, can be implemented in one or more computing devices that include one or more circuits. Thus, at least one of the elements in FIGS. 1-4 can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Figure 6A:
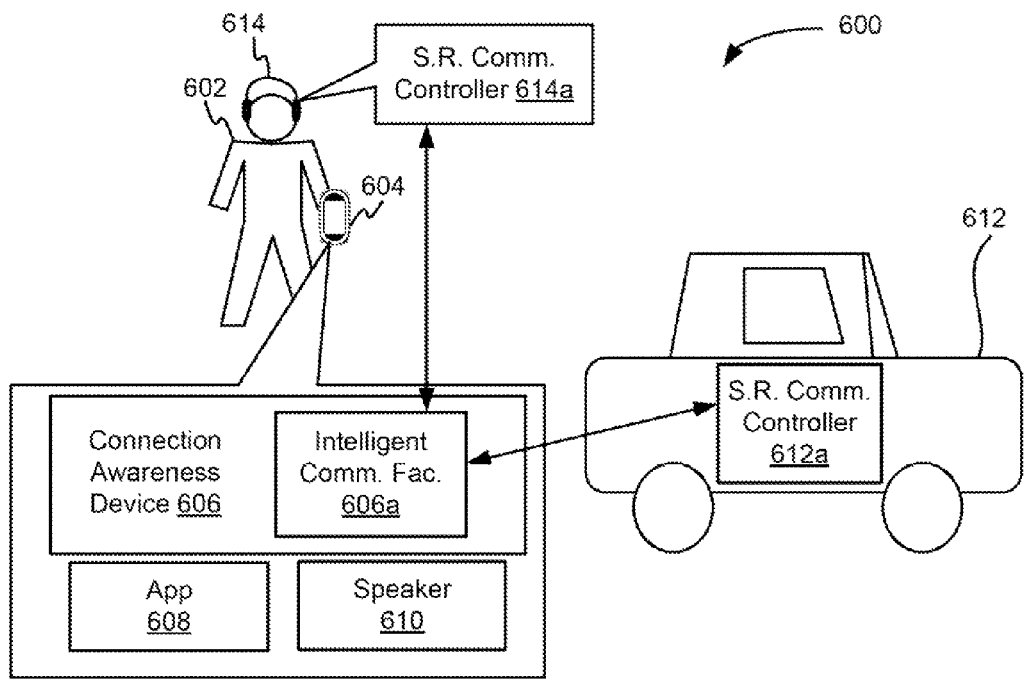
FIGS. 6A-6B illustrate exemplary intelligent device connections between compatible wireless media devices.
Figure 6B:
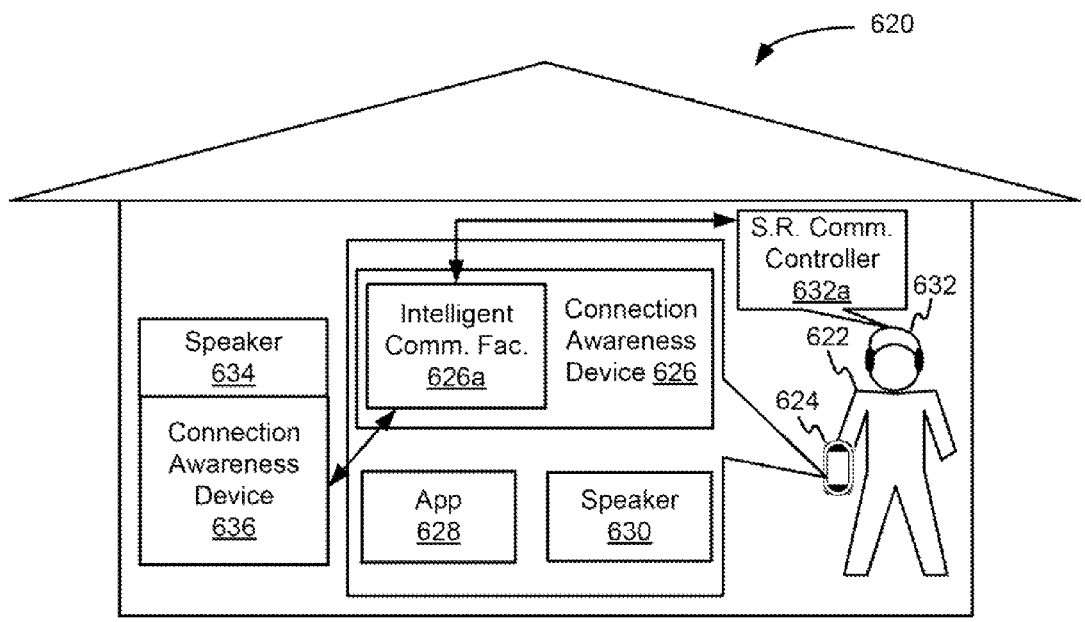

FIGS. 6A-6B illustrate exemplary intelligent device connections between compatible wireless media devices. In FIG. 6A, diagram 600 includes user 602, mobile device 604, car 612, and headphones 614. In some examples, mobile device 604 may be implementing connection awareness device 606, which includes intelligent communication facility 606a, as well as application 608 and speaker 610. In some examples, car 612 may include short-range communication controller 612a. Like-numbered and named elements may describe the same or substantially similar elements as those shown in other descriptions. In some examples, connection awareness device 606 may be configured to determine compatibility of car 612, including whether car 612 has common communication capabilities and whether car 612 has common operational capabilities (e.g. play a type of media, connect a phone call, and the like), as described herein. In some examples, car 612 may be configured to communicate using short-range communication protocols (e.g., Bluetooth®, NFC, ultra wideband, and the like) using short-range communication controller 612*a*. In some examples, short-range communication controller 612*a* may include one or more controllers, each configured to transmit and receive data using a separate short-range communication protocol, as described herein. In some examples, car 612 also may be configured to communicate using longer-range communication protocols (e.g., satellite, mobile broadband, GPS, WiFi, and the like). In some examples, connection awareness device 606 may be configured to detect one or more short-range communication capabilities of car 612 when mobile device 604 is brought (i.e., crosses or passes) within a threshold proximity of short-range communication controller 612*a* and the power in car 612 is turned on (e.g., when user 602 sits in a driver seat in car 612 while holding mobile device 604 and turns on car 612's power, when user 602 turns on car 612's power using a remote while walking within range of car 612's short-range communication transmitter, and the like). For example, intelligent communication facility 606*a* may ping, or otherwise send a message or query to, short-range communication controller 612*a* to determine a type, range and other information about said one or more short-range communication capabilities of car 612. In some examples, connection awareness device 606 may determine further which one of the short-range communication capabilities of short-range communication controller 612*a* is a preferred path or mode for exchanging data associated with any common operations. For example, an NFC path may be preferred for operations involving very little data exchange (e.g., identification, initialization of other operations, and the like) may be performed. In another example, a Bluetooth® path may be preferred for operations involving exchange of more data (e.g., outputting audio data from a telephone call, connecting a telephone call, outputting audio data from a radio station or playlist, or the like). In still another example, an ultra wideband path may be preferred for operations involving high data rates. In some examples, where application 608 is playing audio using speaker 610, connection awareness device 606 may determine that another speaker system implemented in car 612 may be preferred, or better suited (e.g., more powerful, better quality, or the like), for outputting said audio. For example, connection awareness device 606, upon determining compatibility and proximity, automatically may send a query to car 612 to determine its audio output capabilities, and then compare data associated with car 612's audio output capabilities with data associated with speaker 610's audio output capabilities to determine which of car 612 or speaker 610 is a preferred device for playing said audio.

In some examples, intelligent communication facility 606*a* similarly may query short-range communication controller 614*a* to determine short-range communication capabilities of headphones 614, and also may query headphones 614 regarding its operational capabilities (e.g., audio output, communications, or the like). In other examples, intelligent communication facility 606*a* may be configured to communicate with similar short-range communication controllers implemented in other input/output devices. In some examples, connection awareness device 606 may be configured to compare communication and operational capabilities of headphones 614 with communication and operational capabilities of car 612 to determine whether an operation (e.g., playing media content, outputting audio from a telephone call, or the like) being performed by application 608 and speaker 610 may be better transferred to headphones 614 or to car 612. For example, connection awareness device 606 may determine that car 612 is preferred (i.e., better suited) for playing a high quality audio track based on data indicating that car 612 is configured with an ultra wideband controller and high quality speakers, and headphones 614 is configured with Bluetooth® and lower quality speakers. In some examples, connection awareness device 606 may determine a preferred device based on other data, including data from other applications implemented on mobile device 604 (e.g., calendar, contacts, social networks, or the like), data obtained from third-party or remote databases, and environmental data (e.g., from sensor 318 in FIG. 3, other sensors, stored environmental data, or the like). For example, connection awareness device 606 may determine that headphones 614 is preferred for connecting or carrying audio for a private telephone call based on sensor data indicating a presence of others (e.g., passengers in car 612, public spaces, or the like), calendar and/or contacts data indicating the call is of a private nature (e.g., from a family member, close friend, doctor, or the like), and data indicating headphones 614 is configured with both a speaker and a microphone for use in providing input and output functions for a telephone call. In other examples, the quantity, type, function, structure, and configuration of the elements shown may be varied and are not limited to the examples provided.

In FIG. 6B, diagram 620 includes user 622, mobile device 624, headphones 632, speaker 634 and connection awareness device 636. In some examples, speaker 634 may be coupled to connection awareness device 636, and connection awareness device 636 may be configured to send control signals to speaker 634. In some examples, speaker 634 may be configured with one or more communication capabilities, including both short-range (e.g., Bluetooth®, ultra wideband, NFC, and the like) and longer-range communication protocols (e.g., satellite, mobile broadband, GPS, WiFi, and the like). In some examples, connection awareness device 636 may include an intelligent communication facility (not shown), which may be implemented similarly to intelligent communication facility 626*a* or other intelligent communication facilities (e.g., communication facility 144 in FIG. 1B, intelligent communication facility 308 in FIG. 3, intelligent communication facility 400 in FIG. 4A, or the like), as described herein. In some examples, mobile device 624 may include application 628, speaker 630 and connection awareness device 626, including intelligent communication facility 626*a*. In some examples, connection awareness devices 626 and 636 may be configured to communicate with each other to determine proximity, location, compatibility, and preferred devices and connection paths for use in performing operations, as described herein.

In some examples, headphones 632 may include short-range communication controller 632*a*. In some examples, connection awareness device 626 may be configured to communicate with short-range communication controller 632*a*, and other devices or facilities in headphones 632, using intelligent communication facility 626*a*, as described herein, to determine proximity, location, compatibility, and operational capabilities of headphones 632. In some examples, connection awareness device 626 may be configured to compare the communication and operational capabilities of headphones 632 and speaker 634 to determine a preferred device and/or preferred connection path for performing an operation. In other examples, intelligent communication facility 626a may be configured to communicate with similar short-range communication controllers implemented in other input/output devices. In still other examples, the quantity, type, function, structure, and configuration of the elements shown may be varied and are not limited to the examples provided.

Figure 7A:
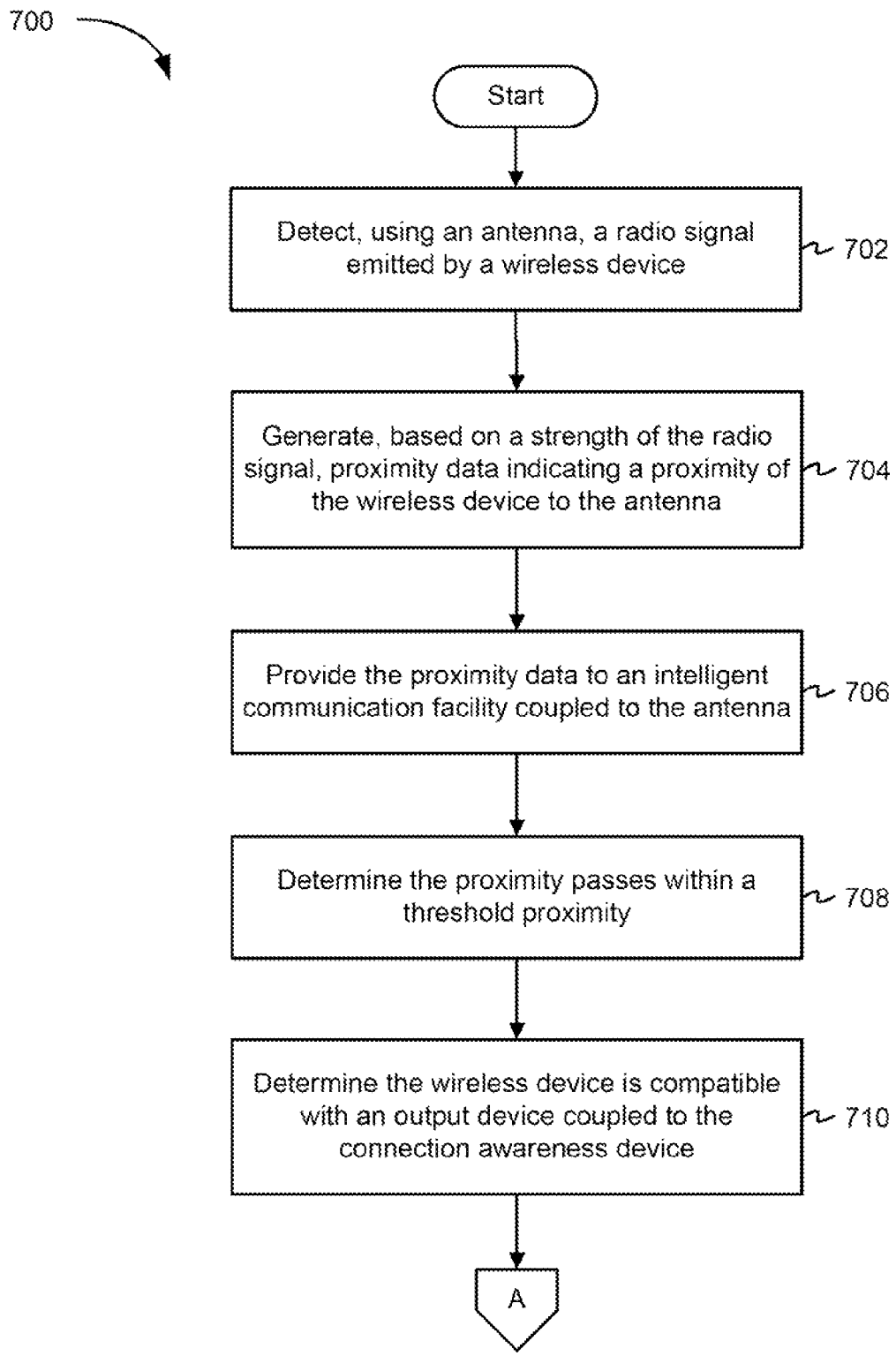
FIG. 7A-7B illustrate an exemplary flow for intelligent device connection in a wireless media ecosystem.
Figure 7B:
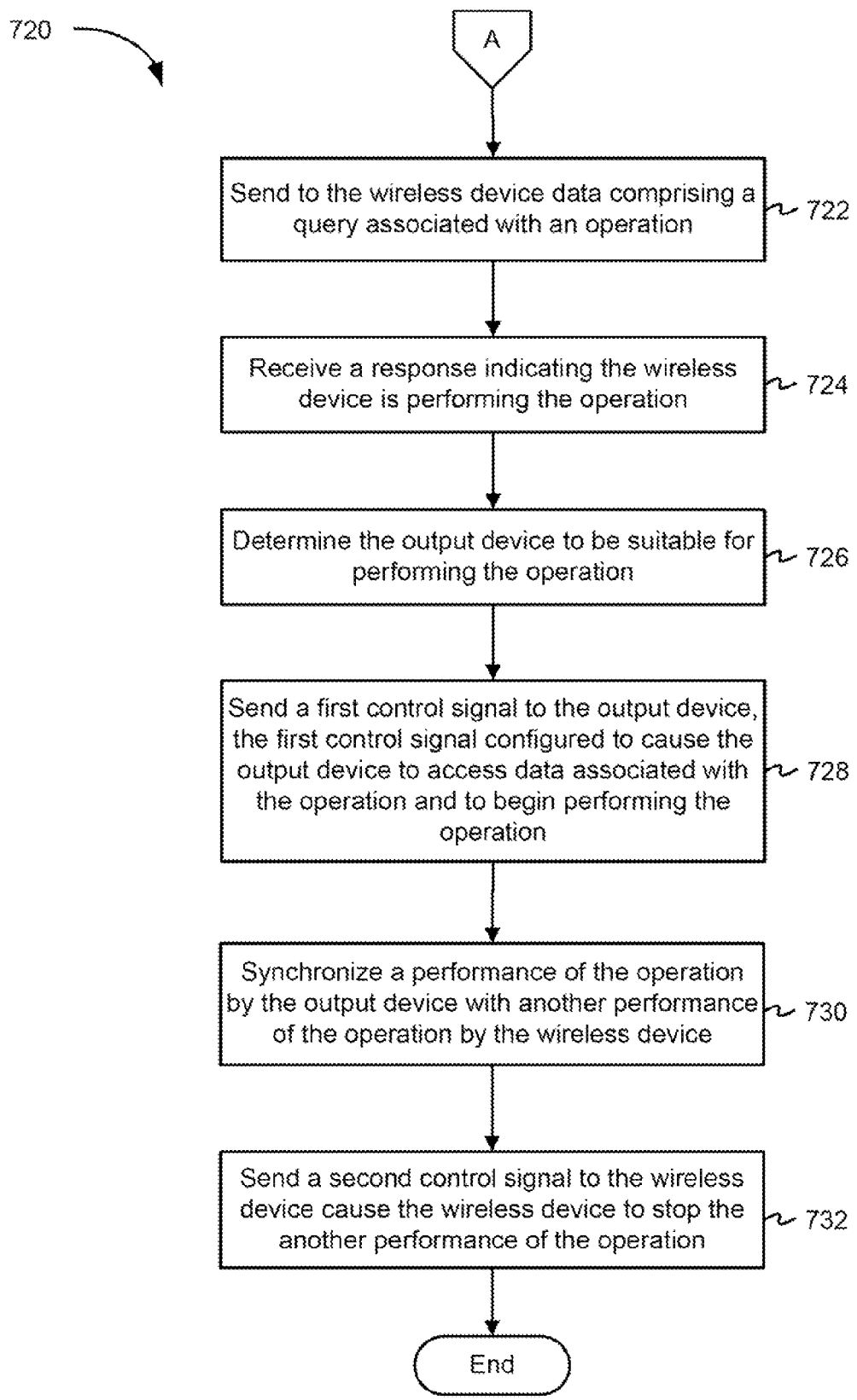

FIG. 7A-7B illustrate an exemplary flows for intelligent device connection in a wireless media ecosystem. FIG. 7A illustrates an exemplary flow for detecting a proximity and compatibility of a wireless device. Here, flow 700 begins with detecting, using an antenna, a radio signal emitted by a wireless device (702). In some examples, the radio signal may be caused by a wireless data exchange being performed by a wireless device (e.g., downloading an electronic mail message ("email"), receiving a push notification, sensing a Bluetooth® or WiFi signal, or the like). In some examples, an antenna may be configured to generate data associated with a radio signal or energy from a wireless device, including proximity data and location data, as described herein. In some examples, such an antenna may be implemented in a connection awareness device, as described herein, and may be configured to detect and generate (i.e., receive and send) radio signals across a broad spectrum, including licensed and unlicensed bands. Once the radio signal is detected, proximity data indicating a proximity of the wireless device to the antenna may be generated based on a strength of the radio signal (704). In some examples, the proximity may indicate a distance between the wireless device and the antenna. For example, a stronger signal may indicate a closer proximity, and a weaker signal may indicate a farther proximity. In other examples, a strength of the radio signal may be evaluated in light of data associated with characteristics of said wireless device, available connection paths, and environmental data, in order to generate proximity data and to refine a determination of proximity. In still other examples, other parameters associated with the radio signal, including, without limitation, frequency, bandwidth, and the like, also may be used to generate proximity data and refine a determination of proximity. In some examples, location data (e.g., data associated with a direction (i.e., in a room or environment, or relative to an antenna or other device), latitude, longitude, other coordinates, location in a given area or room, landmarks, or the like), also may be generated by an antenna and/or derived by another unit or module in a connection awareness device using data from an antenna and other sources (e.g., sensors, databases, and the like). In some examples, the proximity data then may be provided to an intelligent communication facility coupled to the antenna (706). In some examples, said intelligent communication facility may be implemented in a connection awareness device. In some examples, the proximity of a wireless device to an antenna may be determined to pass within a threshold proximity (708), which may indicate that said wireless device has come close enough for a connection awareness device to exchange data associated with an operation with said wireless device. In some examples, a threshold proximity may be associated with a maximum distance at which a connection awareness device may exchange data with said wireless device using a short-range communication protocol. In other examples, other threshold proximities may be determined indicate a preferred or optimum maximum distance for exchanging said data. In some examples, a threshold proximity may be predetermined (i.e., pre-programmed), and may correspond to an available connection path. For example, a threshold proximity for a connection path using a type of Bluetooth® standard (i.e., class 1) may be predetermined to be 100 meters or less, or it may be predetermined to be 30 meters or less for another connection path using a different Bluetooth® standard (i.e., class 2). In another example, a threshold proximity may be predetermined to be 0.2 meters for a connection path using an NFC standard. In some examples, a threshold proximity may be determined dynamically based on characteristics of a radio signal (e.g., strength, frequency, band, and the like), environmental data (e.g. atmospheric, geographic, and other conditions that may affect transmission of radio signals), and characteristics of a wireless device emitting the radio signal, including a type of radio transmitter implemented in the wireless device. In some examples, such environmental data may be captured by one or more sensors implemented in, or coupled to, a connection awareness device. In some examples, a connection awareness device may be configured to automatically query a wireless device within a threshold proximity regarding various types of operations that said wireless device may perform, including without limitation, playing a media content (i.e., from the wireless device's memory, or from a remote source (e.g., satellite, Internet, remote database, and the like)), connecting and/or carrying a telephone call, outputting other audio or video data, and the like. In some examples, once it is determined that a wireless device has come within a threshold proximity of an antenna coupled to a connection awareness device, it may be determined whether the wireless device is compatible with an output device coupled to said connection awareness device (710). In some examples, compatibility may be determined based on common connection capabilities and common operational capabilities, as described herein. In some examples, where it is determined that said output device and said wireless device are unable to communicate directly, but have common operational capabilities, said connection awareness device may be used as an intermediary device for exchanging data between the output device and the wireless device. For example, a wireless device may send data associated with performing an operation to a connection awareness device, and the connection awareness device may, in turn, send said data to an output device (i.e., determined to be a preferred device for performing said operation). In this example, data also may be passed from said output device to said wireless device through said connection awareness device. In other examples, the above-described process may be varied in steps, order, function, processes, or other aspects, and is not limited to those shown and described.

FIG. 7B illustrates an exemplary flow for transferring an operation from a wireless device to a preferred device. Here, flow 720 may continue automatically from flow 700, and may begin with sending to the wireless device data comprising a query associated with an operation (722). In some examples, a connection awareness device may query a wireless device to determine types of operations the wireless device is operable to perform. In some examples, a connection awareness device also may query a wireless device to determine whether the wireless device is performing a type of, or specific, operation (e.g., connecting or carrying a telephone call or video conference call, playing a media content, or the like). A response may be received, for example, by an intelligent communication facility in a connection awareness device, from the wireless device indicating the wireless device is performing the operation (724). As described above, a connection awareness device may be coupled to an output device, and the connection awareness device may determine the output device to be suitable for performing the operation being performed by the wireless device (726). In some examples, said connection awareness device may determine the output device to be a preferred device for performing the operation, as described herein. For example, the output device may be determined to have better audio capabilities for outputting audio for a media content (e.g., songs from a playlist, audio being broadcast by a radio station, or the like) than the wireless device. In other examples, the output device may be preferred for outputting audio for a telephone call, outputting video for a media content, or the like, without limitation. Once the output device is determined to be suitable or preferred for performing the operation, a connection awareness device may send a first control signal to the output device, the first control signal configured to cause the output device to access data associated with the operation and to begin performing the operation (728). The connection awareness device may then synchronize a performance of the operation by the output device with another performance of the operation by the wireless device (730), as described herein. Once the output device's performance of the operation is synchronized with the wireless device's performance of the operation, and the operation has been successfully transferred to the output device (i.e., a preferred device), a second control signal may be sent to the wireless device to cause the wireless device to stop the another performance of the operation by the wireless device (732). In some examples, reverse control signals may be sent from a connection awareness device to stop the output device's performance of the operation, and resume the wireless device's performance of the operation, upon a determination that the wireless device is moving farther away (i.e., decreasing in proximity), and reaching a threshold proximity beyond which data communication cannot be adequately maintained between the wireless device and the connection awareness device. In some examples, a connection awareness device may be configured to perform one or more of the above-described steps automatically in response to a result of, or data generated from, a previous step. In other examples, the above-described process may be varied in steps, order, function, processes, or other aspects, and is not limited to those shown and described.

The foregoing description, for purposes of explanation, uses specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention. Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A method, comprising:
    detecting, using an antenna implemented in a connection awareness device, a radio signal emitted by a wireless device, the antenna configured to send and receive radio signals over a broad spectrum;
    generating, based on a strength of the radio signal, proximity data indicating a proximity of the wireless device to the antenna;
    providing the proximity data to an intelligent communication facility coupled to the antenna;
    determining the proximity passes within a threshold proximity, the threshold proximity being dynamically determined based on environmental data captured by a sensor;
    determining the wireless device is compatible with an output device coupled to the connection awareness device;
    sending to the wireless device data comprising a query associated with an operation;
    receiving a response indicating the wireless device is performing the operation;
    sending a first control signal to the output device, the first control signal configured to cause the output device to access data associated with the operation and to begin performing the operation;
    synchronizing a performance of the operation by the output device with another performance of the operation by the wireless device; and
    sending a second control signal to the wireless device to cause the wireless device to stop performing the operation.

2. The method of claim 1, further comprising determining the output device to be suitable for performing the operation.

3. The method of claim 1, wherein determining the wireless device is a compatible device comprises determining the wireless device to be operable to exchange data using a short-range communication protocol.

4. The method of claim 1, wherein the operation comprises playing a media content from a playlist stored on wireless device.

5. The method of claim 1, wherein the operation comprises playing a media content broadcast by a satellite station.

6. The method of claim 1, wherein the operation comprises playing a media content streamed over the Internet.

7. The method of claim 1, wherein determining the wireless device to be operable to exchange data using a short-range communication protocol comprises:
    sending to the wireless device, by the intelligent communication facility, data to query whether the short-range communication protocol is enabled on the wireless device;
    receiving from the wireless device, by the intelligent communication facility, data indicating the short-range communication protocol is enabled on the wireless device.

8. The method of claim 7, wherein the short-range communication protocol is configured to transmit data in a band of frequencies in a range between 2.4 GHz and 2.5 GHz.

9. The method of claim 7, wherein short-range communication protocol is associated with a near field communication standard.

10. The method of claim 1, wherein the threshold proximity is dynamically determined based on characteristics of the wireless device's transmitter.

11. The method of claim 1, wherein the threshold proximity is less than 100 meters.

12. The method of claim 1, wherein the threshold proximity is less than 0.2 meters.

13. The method of claim 1, wherein the threshold proximity is associated with a maximum distance at which the wireless device and the connection awareness device can exchange data using a short-range communication protocol.

14. The method of claim 1, further comprising determining the output device to be a preferred device for performing the operation.

15. The method of claim 13, wherein the connection awareness device is configured to be used as an intermediary device for exchanging data between the wireless device and the output device.

16. A system, comprising:
- an antenna configured to send and receive radio signals over a broad spectrum;
- a connection awareness device coupled to the antenna, the connection awareness device configured to detect a radio signal emitted by a wireless device, to generate, based on a strength of the radio signal, proximity data indicating a proximity of the wireless device to the antenna, to provide the proximity data to an intelligent communication facility coupled to the antenna, to determine the proximity passes within a threshold proximity, the threshold proximity being dynamically determined based on environmental data captured by a sensor, to determine the wireless device is compatible with an output device coupled to the connection awareness device, to send to the wireless device data comprising a query associated with an operation, to receive a response indicating the wireless device is performing the operation, to send a first control signal to an output device, the first control signal configured to cause the output device to access data associated with the operation and to begin performing the operation, to synchronize a performance of the operation by the output device with another performance of the operation by the wireless device, and to send a second control signal to the wireless device to cause the wireless device to stop performing the operation; and
- a memory configured to store the proximity data, the threshold proximity, and the data associated with the operation.

17. The system of claim 16, further comprising the output device, wherein the output device is configured to access data associated with the operation from a remote source.

18. The system of claim 16, further comprising the output device, wherein the output device is configured to access data associated with the operation from the wireless device.

19. A computer program product embodied in a computer readable non-transitory medium and comprising computer instructions for:
- detecting, using an antenna implemented in a connection awareness device, a radio signal emitted by a wireless device, the antenna configured to send and receive radio signals over a broad spectrum;
- generating, based on a strength of the radio signal, proximity data indicating a proximity of the wireless device to the antenna;
- providing the proximity data to an intelligent communication facility coupled to the antenna;
- determining the proximity passes within a threshold proximity, the threshold proximity being dynamically determined based on environmental data captured by a sensor;
- determining the wireless device is compatible with an output device coupled to the connection awareness device;
- sending to the wireless device data comprising a query associated with an operation;
- receiving a response indicating the wireless device is performing the operation;
- sending a first control signal to an output device, the first control signal configured to cause the output device to access data associated with the operation and to begin performing the operation;
- synchronizing a performance of the operation by the output device with another performance of the operation by the wireless device; and
- sending a second control signal to the wireless device to cause the wireless device to stop performing the operation.

* * * * *